(12) United States Patent
Fujikawa

(10) Patent No.: US 6,430,653 B1
(45) Date of Patent: Aug. 6, 2002

(54) DISK CONTROL UNIT AND METHOD FOR PREFETCHING ACCORDING TO PARTITION INFORMATION AND CONCATENATION INFORMATION

(75) Inventor: Reiji Fujikawa, Tokyo (JP)

(73) Assignee: NEC Corporation, Tokyo (JP)

( * ) Notice: Subject to any disclaimer, the term of this patent is extended or adjusted under 35 U.S.C. 154(b) by 0 days.

(21) Appl. No.: 09/303,560

(22) Filed: May 3, 1999

(30) Foreign Application Priority Data

May 1, 1998 (JP) .......................................... 10-122250

(51) Int. Cl.[7] .............................................. G06F 12/08
(52) U.S. Cl. ........................ 711/113; 711/137; 711/173; 711/213
(58) Field of Search ................................. 711/204, 205, 711/206, 209, 213, 170, 173, 112, 113, 137, 4; 710/7

(56) References Cited

U.S. PATENT DOCUMENTS

| 5,557,767 A | * | 9/1996 | Sukegawa ................... 711/113 |
| 5,584,040 A | * | 12/1996 | Curt et al. ...................... 710/7 |
| 5,600,817 A | * | 2/1997 | Macon, Jr. et al. .......... 711/137 |
| 5,860,079 A | * | 1/1999 | Smith et al. ..................... 711/4 |
| 5,983,319 A | * | 11/1999 | Ito ............................. 711/113 |
| 6,003,115 A | * | 12/1999 | Spear et al. ................ 711/137 |
| 6,029,209 A | * | 2/2000 | Cornaby et al. ............... 710/5 |

FOREIGN PATENT DOCUMENTS

| JP | 63-178352 | 7/1988 |
| JP | 1-250150 | 10/1989 |
| JP | 7-200190 | 8/1995 |
| JP | 9-146834 | 6/1997 |
| JP | 10-124387 | 5/1998 |

OTHER PUBLICATIONS

Microsoft Official Publication (Microsoft Developer Network Library CD–ROM), "Summary of Windows NT NTFS and FTDisk Data," 2 pages., (Jan. 25, 1999).
Microsoft Official Publication (Microsoft Developer Network Library CD–ROM), "File Systems," 78 pages., (Jan. 25, 1999).

(List continued on next page.)

Primary Examiner—Do Hyun Yoo
Assistant Examiner—Gary J. Portka
(74) Attorney, Agent, or Firm—Foley & Lardner

(57) ABSTRACT

A disk control unit and method thereof enable read-in speed to be improved regarding a file which is stored in a fixed drive discontinuously. A prefetch decision circuit receives instructions from an instruction decode circuit. The prefetch decision circuit decides to which partition the instructions belong while comparing them with information of a partition map. The prefetch decision circuit presumes to which file the instructions belong while comparing them with information of a predictive cache entry. Next, the prefetch decision circuit directs read-in of a part of the file to the disk control circuit while determining to which block the instructions are connected to which block, thus storing prefetch data being read-in in disk cache. An instruction decode circuit, when read-in instruction is sent from a computer, compares the data regarding the instruction with the prefetch data. When the data regarding the instructions coincides with the prefetch data, the instruction decode circuit transmits the prefetch data of the disk cache to the computer without performing read-in operation on the fixed drive practically. Thereby, the unit causes the read-in speed to be improved in connection with the file which is stored discontinuously in the fixed drive.

4 Claims, 10 Drawing Sheets

OTHER PUBLICATIONS

Microsoft Official Publication (Microsoft Developer Network Library CD–ROM), "Which is Faster, FAT or NTFS?" 2 pages., (Jan. 25, 1999).

Microsoft Official Publication (Microsoft Developer Network Library CD–ROM), "About File Systems," 15 pages., (Jan. 25, 1999).

Microsoft Official Publication (Microsoft Developer Network Library CD–ROM), "Windows NT File Systems," 1 page, (Jan. 25, 1999).

Microsoft Official Publication (Microsoft Developer Network Library CD–ROM), "NTFS File System Advantages," 1 page, (Jan. 25, 1999).

Microsoft Official Publication (Microsoft Developer Network Library CD–ROM), "NTFS File Attributes," 5 pages., (Jan. 25, 1999).

Microsoft Official Publication (Microsoft Developer Network Library CD–ROM), "Overview of FAT, HPFS, and NTFS File Systems," 7 pages., (Jan. 25, 1999).

Microsoft Official Publication (Microsoft Developer Network Library CD–ROM), "Disk Sectors Critical to the Startup Process," 18 pages., (Jan. 25, 1999).

* cited by examiner

DISK CONTROL UNIT AND METHOD FOR PREFETCHING ACCORDING TO PARTITION INFORMATION AND CONCATENATION INFORMATION

BACKGROUND OF THE INVENTION

The present invention relates to a disk control unit and method thereof. More to particularly this invention relates to a disk control unit and method thereof in order to read-out data of a fixed drive.

Description of the Prior Art

By way of conventional disk control unit and a method thereof, for instance, in some cases the access for the file is performed continuously, while assuming the sequential access. Further, by way of another conventional disk control unit and a method thereof, the unit learns the preceding access method, and when there is a next access, an access is performed in the same method thereof (referring to the Japanese Patent Application Laid-Open No. HEI 10-124387).

However, in the continuously accessing method of the disk control unit and the method thereof indicated in the conventional example described-above, when the file of a candidate to be accessed is stored non-continuously, there is a problem that performance deteriorates by the fact that the disk control unit fetches unnecessary portion in advance.

Further, in the another conventional disk control unit and the method thereof, the unit learns the preceding access method, and when there is a next access, the access is performed in the same method thereof. A satisfactory performance is indicated about the access on and after the second time, however, there is a problem that the unit can not exercise performance because there is no basis to be learned in the access of the first time.

SUMMARY OF THE INVENTION

In view of the foregoing, it is a first object of the present invention, in order to overcome the above-mentioned problem, to provide a disk control unit and a method thereof which enable read-in speed to be improved regarding the file which is stored in a fixed drive discontinuously.

It is a second object of the present invention, to provide a disk control unit and a method thereof which enable data to be fetched in advance, which data corresponds to respective file systems, even though a fixed drive is separated into a plurality of partitions, thus a plurality of file systems are mixed in a plurality of partitions.

According to a first aspect of the present invention, in order to achieve the above-mentioned objects, there is provided a disk control unit which comprises information storage means for storing therein partition information contained in a fixed drive and information of concatenation structure of a file which is contained in the fixed drive, a decode means for decoding information for the sake of prefetch according to both of the partition information stored in the information and the information of concatenation structure of the file, a prefetch means for performing prefetch of data of the fixed drive according to decoded result by the decode means, a prefetch data storage means for storing therein the data which is read-in by the prefetch means temporarily, and a data transmission means for transmitting data which is stored in the prefetch data storage means toward a computer without performing read operation on the fixed drive practically when the data regarding the read-in instruction coincides with the data stored in the prefetch data storage means, in the cases where the read-in instruction is sent from the computer.

According to a second aspect of the present invention, there is provided a disk control unit which is connected to a computer and to a fixed drive, and which is provided with an instruction decode circuit, a partition map, a predictive cache entry, a disk cache, a prefetch program, a prefetch decision circuit, and a disk control circuit, wherein the instruction decode circuit is connected to the computer to decode to be executed the instruction from the computer, the partition map is connected to the instruction decode circuit to maintain a partition information of the fixed drive, the predictive cache entry is connected to the prefetch decision circuit to maintain concatenation state of the file which is contained in the fixed drive, the disk cache is connected to the instruction decode circuit to maintain both of data in which read-in and write occur in the instruction decode circuit, and data which is read-in in the prefetch decision circuit, the prefetch program is connected to the prefetch decision circuit to include decode program in every file system of the prefetch decision circuit, the prefetch decision circuit which is connected to the instruction decode circuit, to the predictive cache entry, and to the disk control circuit, receives read-in instruction which occurs in the instruction decode circuit, thus determining that the read-in instruction belongs to which partition while comparing with the information of the partition map, then presuming that the read-in instruction belongs to which file while comparing with an information of the predictive cache entry, subsequently directing read-in of block portion toward the disk control circuit while determining that the read-in instruction is connected to which block, next storing prefetch data read-in previously in the disk cache, the disk control circuit which is connected to the fixed drive, the instruction decode circuit, and the prefetch decision circuit, receives the read-in data and write instruction from the instruction decode circuit and the instruction from the prefetch decision circuit, thus performing control of the fixed drive, and the instruction decode circuit transmits the prefetch data which is stored in the disk cache toward a computer without performing read operation on the fixed drive practically when the data regarding the read-in instruction coincides with the prefetch data stored in the disk cache, in the cases where the read-in instruction is sent from the computer.

According to a third aspect of the present invention, in the second aspect, there is provided a disk control unit which has a program rewrite means for rewriting the prefetch program according to instruction from the computer.

According to a fourth aspect of the present invention, there is provided a disk control unit which is connected to a computer and to a fixed drive, and which is provided with an instruction decode circuit, a partition map, a predictive cache entry, a disk cache, a prefetch program, a prefetch decision circuit, a RAID data generation circuit, and a RAID disk cache, wherein the instruction decode circuit is connected to the computer to decode to be executed instruction from the computer, the partition map is connected to the instruction decode circuit to maintain a partition information of the fixed drive, the predictive cache entry is connected to the prefetch decision circuit to maintain concatenation state of the file which is contained in the fixed drive, the disk cache is connected to the instruction decode circuit to maintain both of data in which read-in and write occur in the instruction decode circuit, and data being read-in in the prefetch decision circuit, the prefetch program is connected to the prefetch decision circuit to include decode program in every file system of the prefetch decision circuit, the prefetch decision circuit which is connected to the instruction decode circuit, to the predictive cache entry, and to the RAID data generation circuit, receives a read-in instruction which occurs in the instruction decode circuit, thus determining that the read-in instruction belongs to which partition while comparing with the information of the partition map, then presuming that the read-in instruction belongs to which file while comparing with an information of the predictive cache entry, subsequently directing read-in of block portion toward the RAID data generation circuit while determining that the read-in instruction is connected to which block, next storing prefetch data being read-in previously in the disk cache, the RAID data generation circuit which is connected to a plurality of the fixed drives, the instruction decode circuit, and the RAID disk cache, receives the read-in data and write instruction from the instruction decode circuit and the instruction from the prefetch decision circuit, thus performing control of the fixed drive and performing storage and update of the data to the RAID disk cache, the instruction decode circuit transmits the prefetch data which is stored in the disk cache toward a computer without performing the read operation on the fixed drive practically when the data regarding the read-in instruction coincides with the prefetch data stored in the disk cache, in the cases where the read-in instruction is sent from the computer.

According to a fifth aspect of the present invention, in the fourth aspect, there is provided a disk control unit which has a program rewrite means for rewriting the prefetch program according to instruction from the computer.

According to a sixth aspect of the present invention, there is provided a disk control method which comprises the steps of an information storage step for storing both of partition information contained in a fixed drive and information of concatenation structure of a file contained in the fixed drive, a decode step for decoding information for the sake of prefetch according to both of partition information of the information storing means and information of file concatenation structure, a prefetch step for performing prefetch of data of the fixed drive according to decoded result of the decode step, a prefetch data storage step for storing data being read-in by the prefetch step in prefetch data storage means temporarily, and a prefetch data transmission step for transmitting the prefetch data which is stored in the prefetch data storage means toward a computer without performing the read operation on the fixed drive practically when the data regarding the read-in instruction coincides with the prefetch data stored in the prefetch data-storage means, in the cases where the read-in instruction is sent from the computer.

The above and further objects and novel features of the invention will be more fully understood from the following detailed description when the same is read in connection with the accompanying drawings. It should be expressly understood, however, that the drawings are not intended as a definition of the limits of the invention.

DETAILED DESCRIPTION OF THE PREFERRED EMBODIMENTS

Figure 1:
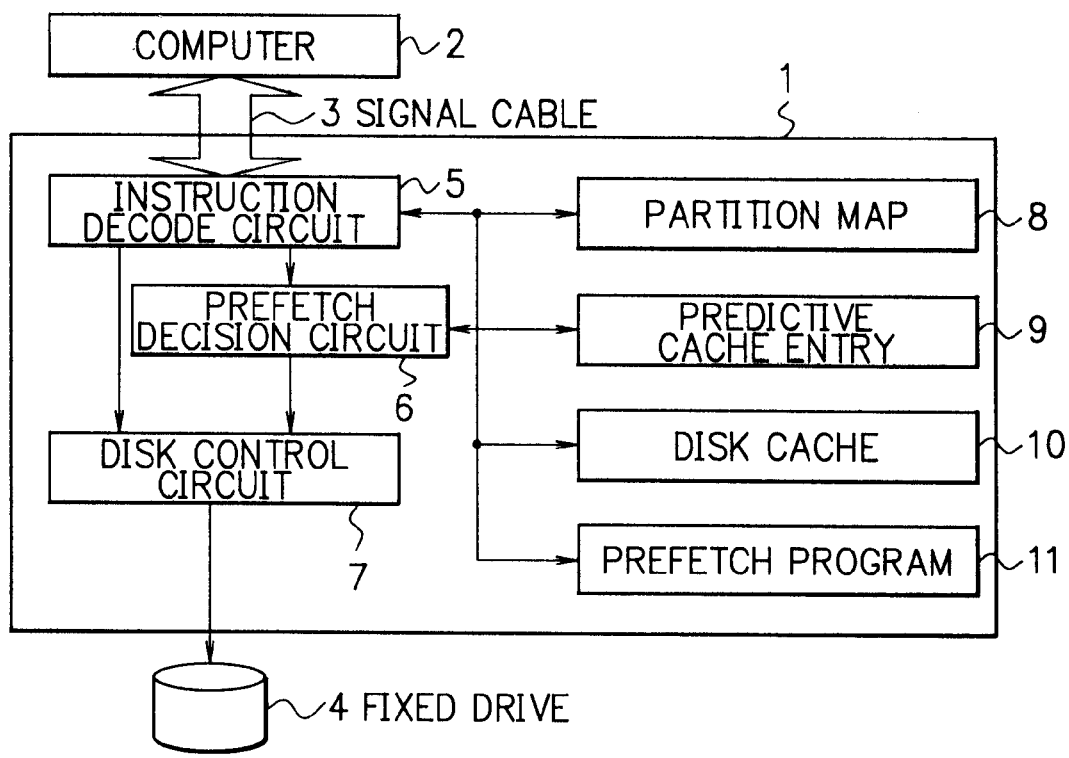
FIG. 1 is block diagram showing a disk control unit according to a first embodiment of the present invention.

A preferred embodiment of a disk control unit and a method thereof will be described in detail in accordance with the accompanying drawings. As shown in FIG. 1, the disk control unit 1 by way of the first embodiment of the present invention is connected to a computer 2 through a signal cable 3. Further, the disk control unit 1 is connected to a fixed drive 4.

The disk control unit 1 is provided with an instruction decode circuit 5, a prefetch decision circuit 6, a disk control circuit 7, a partition map 8, a predictive cache entry 9, a disk cache 10, and a prefetch program 11. The instruction decode circuit 5 is connected to the computer 2, the prefetch decision circuit 6, the disk control circuit 7, the partition map 8, the predictive cache entry 9, the disk cache 10, and the prefetch program 11. The disk control circuit 7 is connected to the prefetch decision circuit 6 and the fixed drive 4. The prefetch decision circuit 6 is connected to the predictive cache entry 9.

The instruction decode circuit 5 decodes instructions to be executed from the computer 2, thus controlling the prefetch decision circuit 6, the disk control circuit 7, the partition map 8, the predictive cache entry 9, and the disk cache 10 as required. The partition map 8 maintains partition information of the fixed drive 4. The predictive cache entry 9 maintains concatenation state of the files contained within the fixed drive 4. The configuration of the predictive cache entry 9.is that there is prepared a plurality of groups of the head numbers of continuous clusters, the last number, and next the head number of the cluster of discontinuous access.

The disk cache 10 maintains data that read-in and write occur at the instruction decode circuit 5, and that read-in is performed at the prefetch decision circuit 6. The prefetch decision circuit 6 receives read-in instruction occurring at the instruction decode circuit 5. The prefetch decision circuit 6 decides which read-in instruction belongs to which partition, while comparing them with partition map 8. The prefetch decision circuit 6 presumes to which file the read-in instruction belongs, while comparing them with the predictive cache entry 9. Next, the prefetch decision circuit 6 determines to which block the read-in instruction is connected. The prefetch decision circuit 6 directs the read-in of that portion to the disk control circuit 7.

The disk control circuit 7 receives a read-in data from the instruction decode circuit 5, a write instruction, and an instruction from the prefetch decision circuit 6 to perform control of the fixed drive 4. The prefetch program 11 includes a decode program in every file system of the prefetch decision circuit 6.

Next, there will be described operation of the disk control unit 1 according to the first embodiment of the present invention in accordance with FIGS. 1 to 11. Firstly, there is described operation at the time of turning on the power supply to the disk control unit 1.

When the power supply is turned on for the disk control unit 1 shown in FIG. 1 or an initialize signal is transmitted from the computer 2 to the disk control unit 1, the disk control unit 1 starts an initialize processing.

Figure 2:
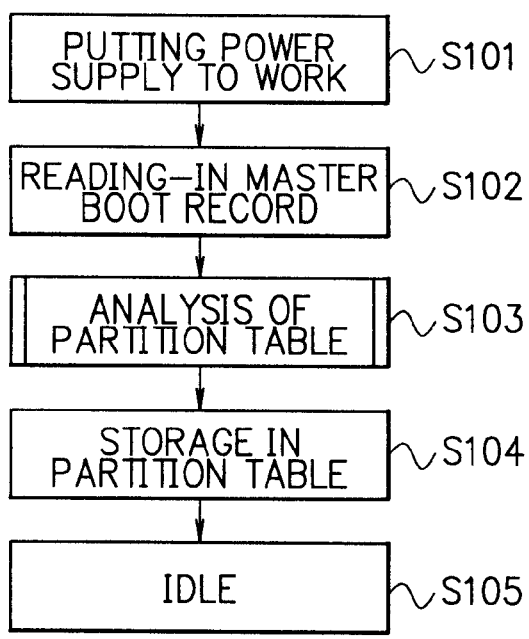
FIG. 2 is a flowchart for explaining operation at the time of putting the power supply to work for the disk control unit of FIG. 1.

As shown in FIG. 2, in STEP 101, the instruction decode circuit 5 commences power start up to the unit. In STEP 102, the instruction decode circuit 5 gives instruction to the disk control circuit 7 so as to read-in a master boot record. The master boot record is, when the unit starts from the fixed drive 4, an area to be read-in. A partition (divided) table of the fixed drive 4 is stored in the master boot record. The disk control circuit 7 controls the fixed drive 4. The disk control circuit 7 reads a specified data, thus sending back the result to the instruction decode circuit 5. In STEP 103, the unit gives instruction to the prefetch decision circuit 6 so as to analyze the partition table read-in in STEP 102, thus storing the result in the partition map 8 in STEP 104. Subsequently, in STEP 105, the instruction decode circuit 5 enters into an idle state to wait commands for other procedures.

Next, there will be described analysis of the partition map 8 in detail.

Figure 3:
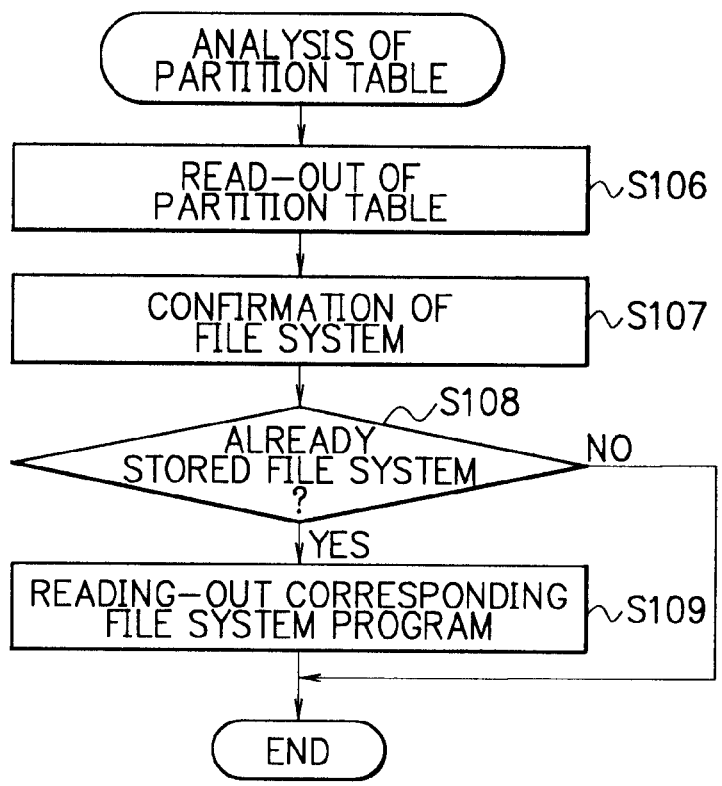
FIG. 3 is a flowchart for explaining outline of partition analysis of the disk control unit of FIG. 1.

As shown in FIG. 3, the prefetch decision circuit 6 reads-out the partition table from the master boot record of STEP 102 in STEP 106. Next, in STEP 107, the prefetch decision circuit 6 confirms file system of the partition under investigation now. Further, the file system of the partition is capable of being analyzed by a 1 byte code.

In STEP 108, an inquiry to the prefetch program 11 is performed to determine whether or not the file system is previously stored therein by way of a program which is possible to be analyzed. The file system is the previously stored file system and analyzable. In STEP 109, the prefetch decision circuit 6 calls-the program from the prefetch program 11, thus performing initialization to be performed return for precedence portion. After this processing, when there is a disk access for the partition concerned, the processing is performed, while calling the subprogram. Further, when analysis in the system is impossible, there is performed return for precedence portion regardless of particular processing. In this case, it becomes possible to exercise performance which is the same as that of the conventional one by the fact that the past prefetch algorithm is used. The above processing is performed for all of the partitions.

There will be described a program step which is called in STEP 109 in detail. In this part, the subprogram which is used changes depending on the file system which is a candidate. Therefore, the program step is applied to a FAT (File Allocation Table) file system, and an NT File System (hereinafter referring to NTFS) which are used for a PC (Personal Computer), that will be described hereinafter.

The FAT file system is managed by a management file of directory-entry with hierarchical structure about the head position. There is stored the head position of substance of the file such as the name of the file or the date and time for making thereof in the record corresponding to one file of the directory-entry. The contents of the file are arranged at one or a plurality of cluster (combining. sector in management unit).

Link information of a cluster to the next cluster is kept in the entry of file allocation table. When there is specified a particular cluster, the state of the cluster is determined unconditionally as to whether or not the cluster is used, when the cluster is used, whether or not the cluster is the last cluster, and when the cluster is not the last cluster namely the cluster is connected to another cluster, to which cluster it is linked. The NT file system (NTFS) is a recent file system. The NTFS has flexibility in terms of security which is a defect of the FAT file system. The NTFS adopts a method for performing management, while storing file information or disk usage information within some system files. The file, called MFT, achieves an important role on read-in of the file. The whole general information of the file in the disk is stored in the MFT. The particular file information within the MFT consists of attribute object indicating name of file and so forth, security object, audit object, and content object.

When the size of each object is sufficiently small, the contents are stored in the MFT directly. When the size of each object is large, the MFT becomes a pointer which indicates position (cluster) where the object is stored therein actually. According to the technique, the whole information can be obtained when one calls a file information if the file is sufficiently small. When the file is large, it is possible to know the position of the contents.

With respect to the FAT file system and NTFS, there is described in Microsoft official publication (Microsoft Developer Network Library CD-ROM) and another publications.

Figure 4:
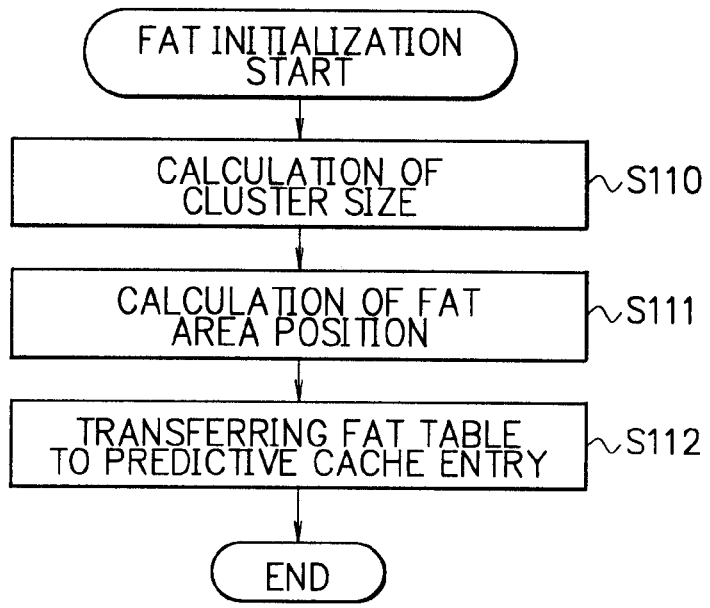
FIG. 4 is a flowchart for explaining analysis of FAT (File Allocation Table) file system in the disk control unit of FIG. 1.

When there is performed the FAT file system, the FAT system is loaded to be initialized . The procedure is shown in FIG. 4. In STEP 110, the unit analyzes a part in which the FAT is stored to calculate the actual cluster size. In succession, in STEP 111, the unit calculates the size of the FAT, and the stored position. In STEP 112, the unit decodes table of the FAT, thus finding continuous parts, and parts accessed discontinuously so as to store them in the predictive cache entry 9.

For instance, in a table of the FET, on referring to a part corresponding to cluster 0044, if there is described 0045 0046 0047 0049 FFFF FFF0, access is performed from the cluster 0044 to 0047 without a break, next, accessing 0049. The cluster 0048 is a vacant area, not recorded accordingly. Although cluster 0049 is accessed, it is not subjected to a file access at this point, and therefore, not recorded. These are transferred to the predictive table. The return is performed when the investigation is completed about the whole cluster.

In the case of NT file system, there is performed an analysis of file information which is contained in the MFT file, thus storing link information into the predictive area. For instance, when there is recorded that the substance of the file "ABC" is stored from the cluster 200 to 245, and from the cluster 300 to 305 within the table of the MFT, there is performed an entry to permit the unit to accesses successively from the cluster 200 to 245, next, the unit accesses successively from the cluster 300 to 305.

Figure 5:
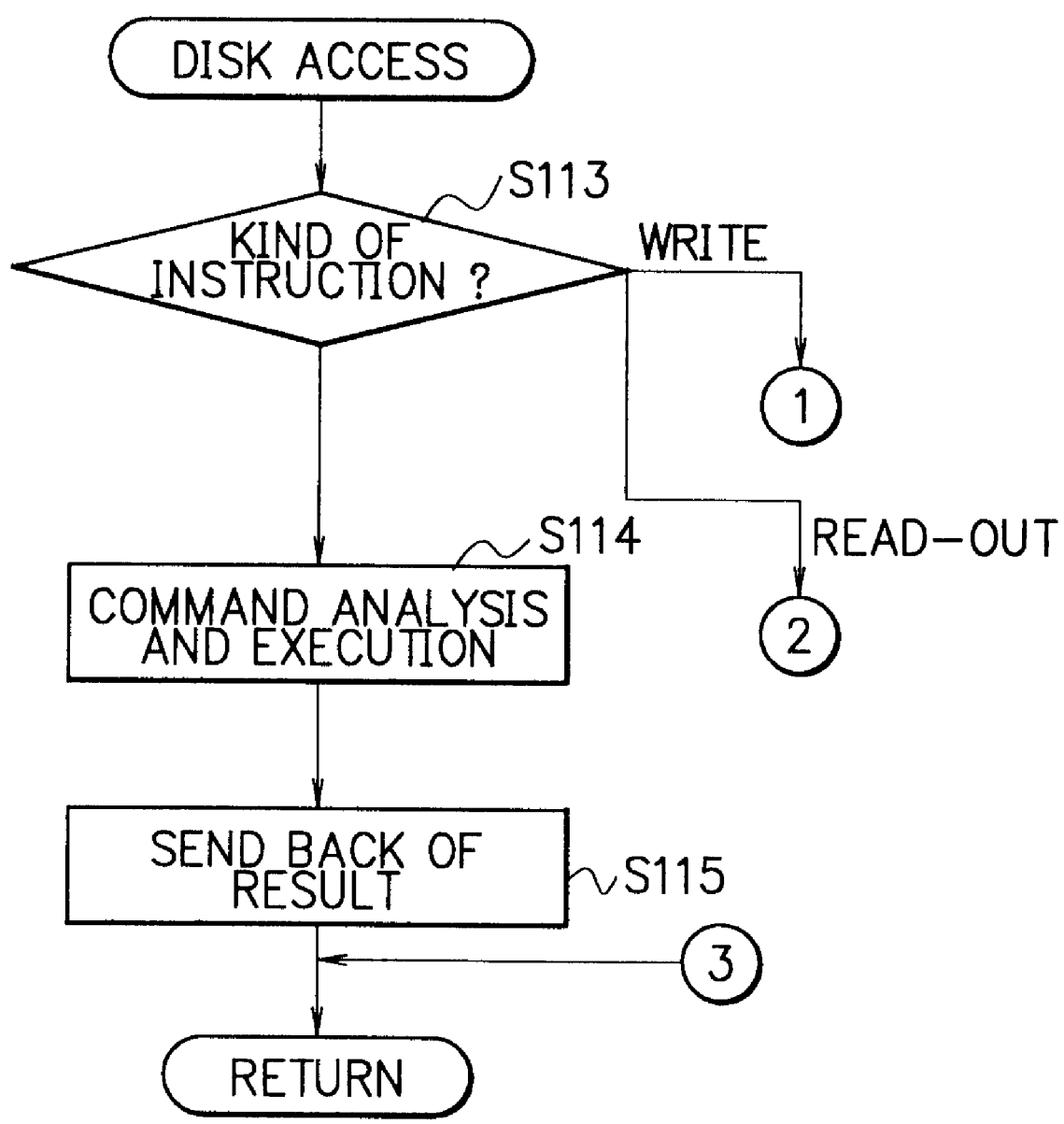
FIG. 5 is a main flowchart for explaining operation at the time of disk access of the disk control unit of FIG. 1.

Next, there will be described the case where access is performed from the computer 1 using FIG. 5. Firstly, the instruction decode circuit 5 analyzes the kind of instruction in STEP 113. There branches from STEP 113 in such a way that if the kind of instruction is write, proceeding to ⓑ, if the kind of instruction is read-in, proceeding to ⓒ, if the kind of instruction is other than the above write or read-in, proceeding to STEP 114. In STEP 114, there is analyzed the command which is sent, and in STEP 115, the result is returned. For instance, in the case where a self-diagnostic command is sent, the self-diagnostic is performed. If the result is normal, a normal code is returned. If the result is abnormal, a code which indicates abnormal is returned.

There will be described the case where the instructions received is related to the write operation using FIG. 6. In STEP 116, command is issued to the disk control circuit 7 so as to write the data into fixed drive 4. The disk control circuit 7 writes data at the specified position to return the result to the instruction decode circuit 5.

In STEP 117, a command is issued to the disk cache 10 that the information is to be updated. In STEP 118, there is confirmed that the position of the data stored is updated as compared with a partition information contained in the partition map 8. In the case where the boot master record is updated, it proceeds to STEP 119. In the case where there is decided that data renewal within specific partition is performed, proceeding to STEP 121. In the case where area without partition is updated, processing is completed.

In STEP 119, confirmation is performed as to whether or not partition information is updated. When the partition information is updated, re-read-in of the partition information is performed in STEP 120, thus terminating processing. In STEP 121, inquiry as to whether the analysis program for partition is being accessed is already loaded, is made to the prefetch decision circuit 6. When the load is terminated, the process proceeds to STEP 122, to perform a partition analysis (write) to prefetch decision circuit 6.

Figure 8:
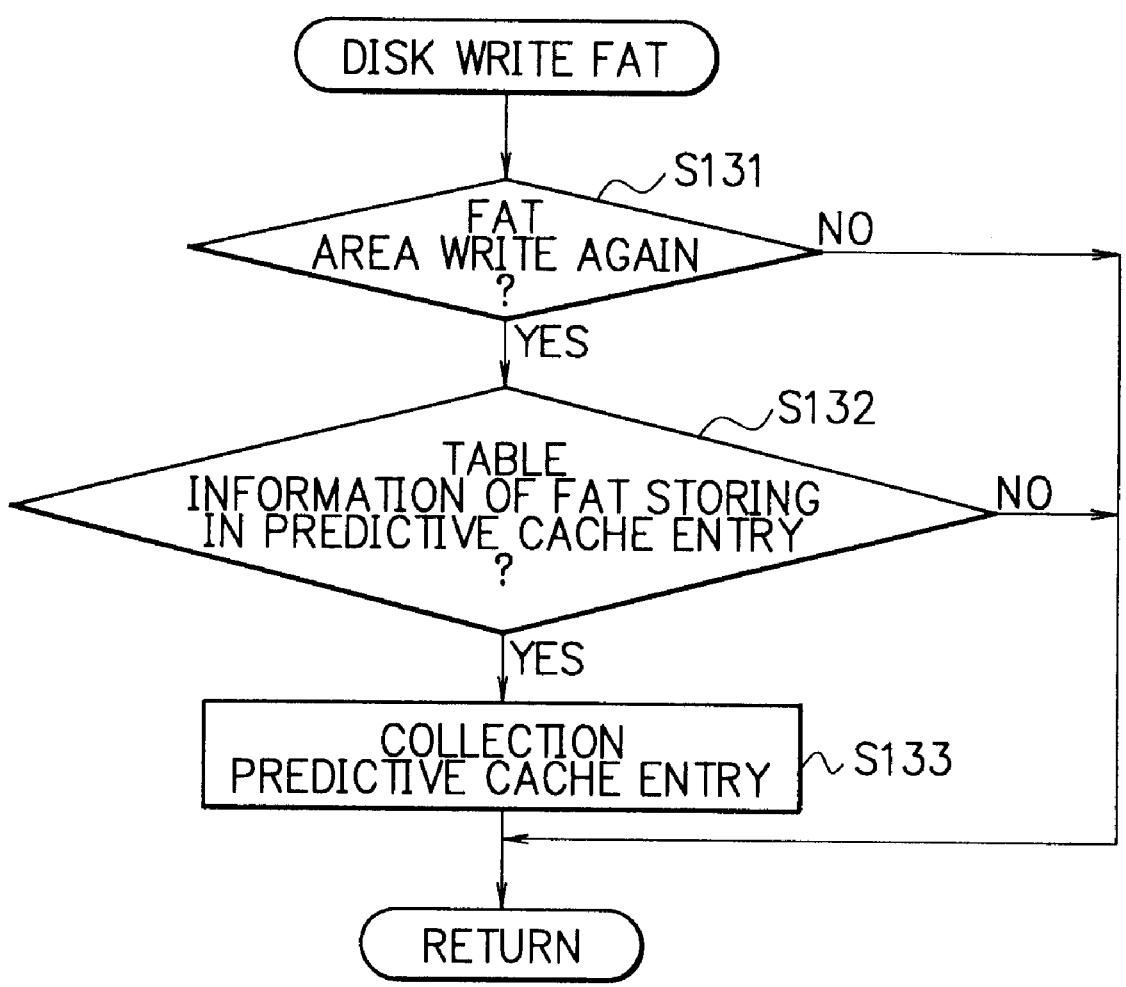
FIG. 8 is a flowchart for explaining operation at the time when there occurs write in the FAT (File Allocation Table) file system in the disk control system of FIG. 1.

There will be described the case where write occurs in the FAT file system using FIG. 8. In STEP 131, the prefetch decision circuit 6 investigates whether or not write occurs in the FAT area of the FAT file system. In the case where write does not occur in the FAT area, processing is not performed but the return is performed, because link information of the file is not updated. When an update occurs on the FAT area, in STEP 132, confirmation is performed whether or not a table information of the FAT is practically stored in the predictive cache entry 9. When the table information is not stored in the predictive cache entry 9, processing is not performed but the return is performed. When the table information is stored in the predictive cache entry 9, the process proceeds to STEP 133. An information of the FAT area is decoded, then alteration of the predictive cache entry 9 is executed.

Figure 9:
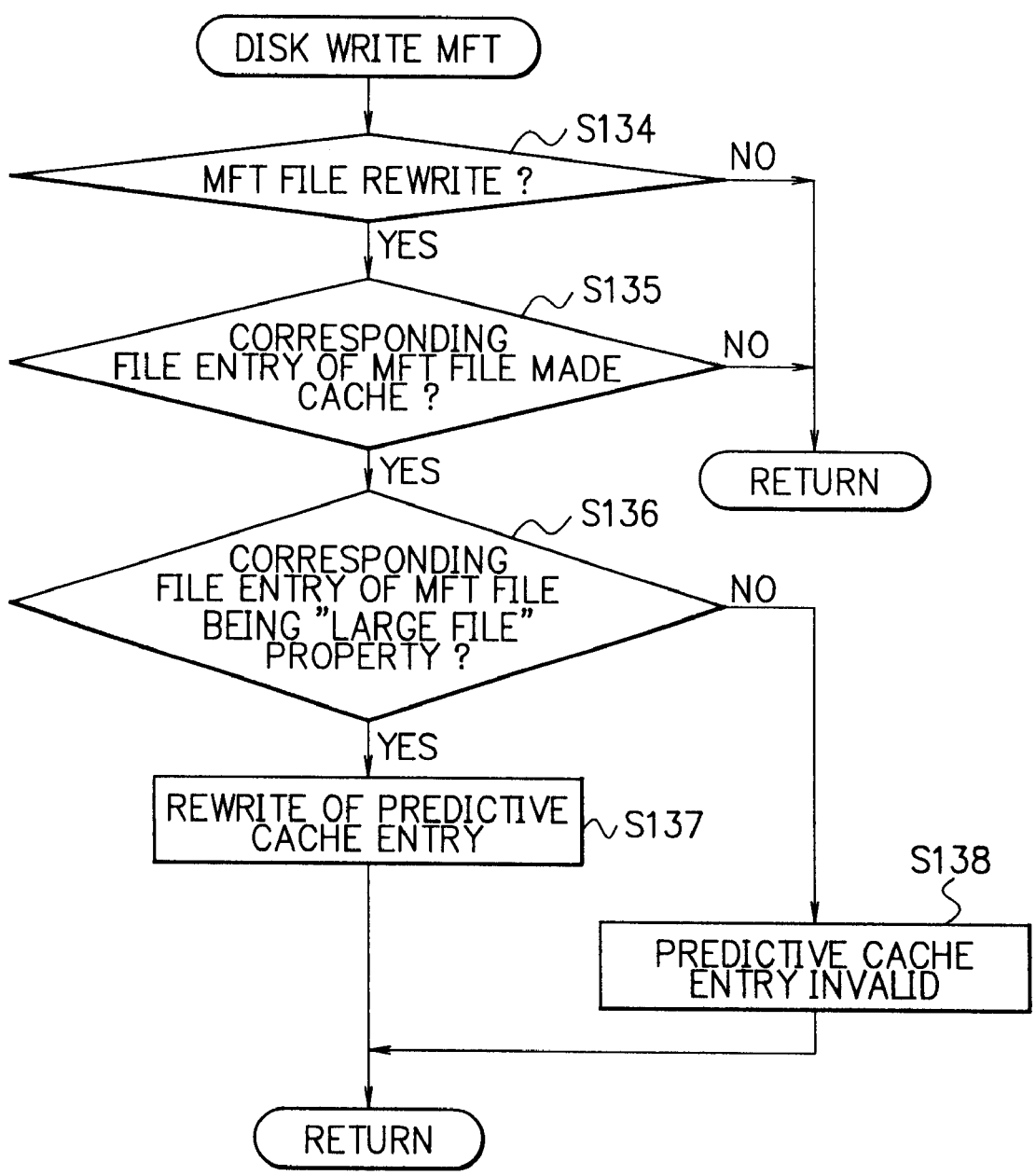
FIG. 9 is a flowchart for explaining operation at the time when there occurs write in NTFS (NT File System) in the disk control unit of FIG. 1.

Next, there will be described the case where an update is performed in the NT file system using FIG. 9. The prefetch decision circuit 6 investigates, in STEP 134, whether or not the MFT file is updated. When the MFT file is not updated, a processing is not performed but a return is performed. When the MFT file is updated, a scan is performed on the MFT file, and it is investigated as to whether or not a part where writing is performed is cached within the predictive cache entry 9 in STEP 135. When the part performed write is not made cache, the return is performed.

When the part performed write is made cache, proceeding to STEP 136. The file entry is correspondingly investigated. There is investigated whether or not an attribute of the file becomes "Large File" property. When it does not become "Large File" property, it is indicated that the file is not written in another part. Therefore, in STEP 138, the corresponding predictive cache entry is made to be invalid to make return. When it becomes "Large File" property, in STEP 137, the predictive cache entry 9 is rewritten to make return. When partition analysis is terminated, terminating processing to make return.

Figure 7:
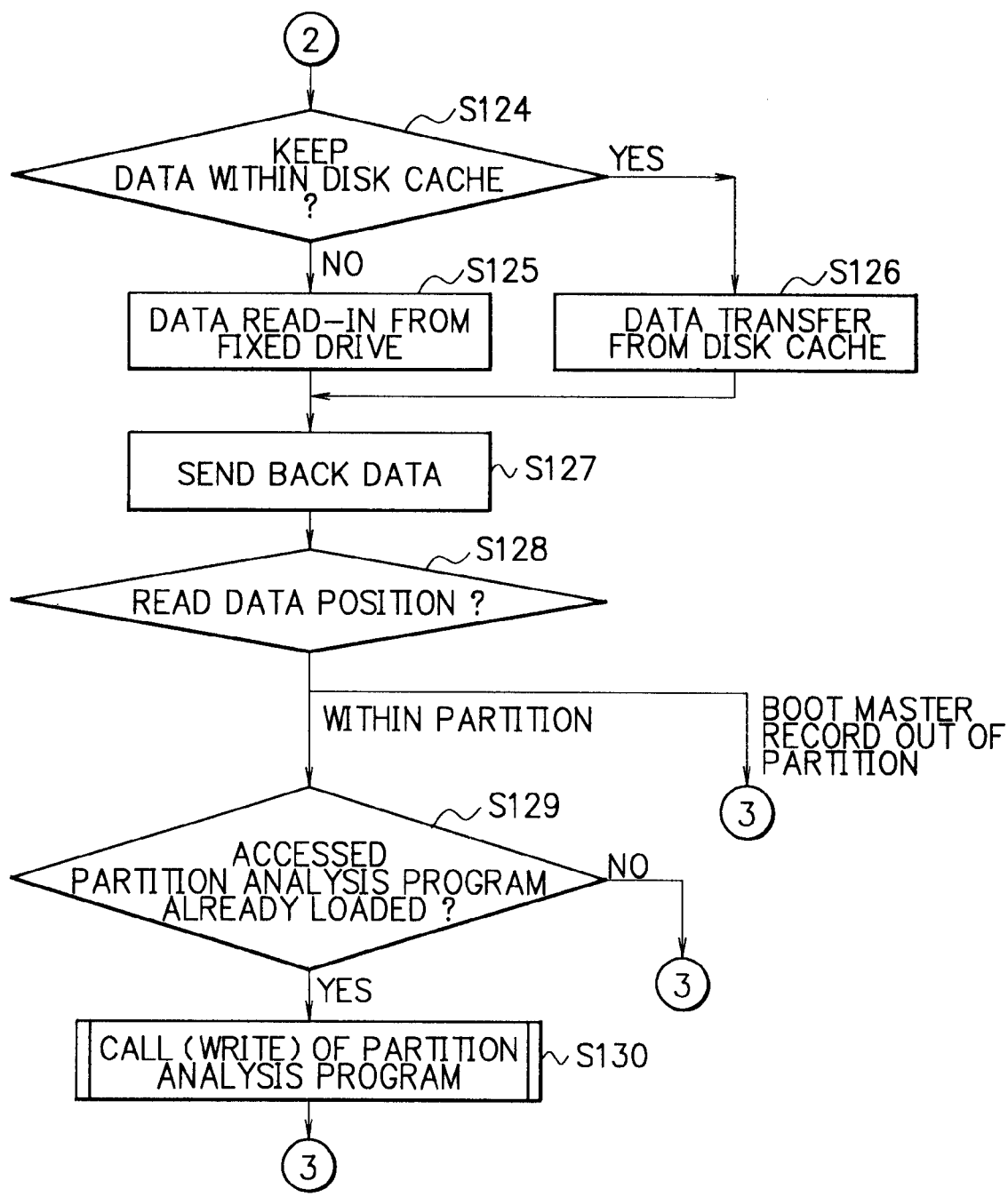
FIG. 7 is a main flowchart for explaining operation at the time when there occurs read-in of the disk control unit of FIG. 1.

Next, there will be described the case where a read-in instruction occurs from the computer 1 using FIG. 7. The instruction decode circuit 5 retrieves, in STEP 124, data within the disk cache 10. When the data is kept within the disk cache 10, the data is read out from disk cache 10 to transfer, in STEP 127, to the computer 2. While when the data is not kept within the disk cache 10, an indication is, in STEP 125, issued to the disk control circuit 7, thus read-in is performed from the fixed drive 4 in terms of necessary data to transfer, in STEP 127, to the computer 2.

Next, there is confirmed, in STEP 128, the read-out position. If the confirmed read-out position is the boot master record or without partition, processing is terminated to make return. If the confirmed read-out position is partitioned, then the procedure goes to STEP 129. It causes the prefetch decision circuit 6 to confirm whether or not the analysis program of the corresponding partition is already loaded. When the load is not performed, a return is made while terminating processing. When the load is performed, the prefetch decision circuit 6 is called, before terminating processing.

Figure 10:
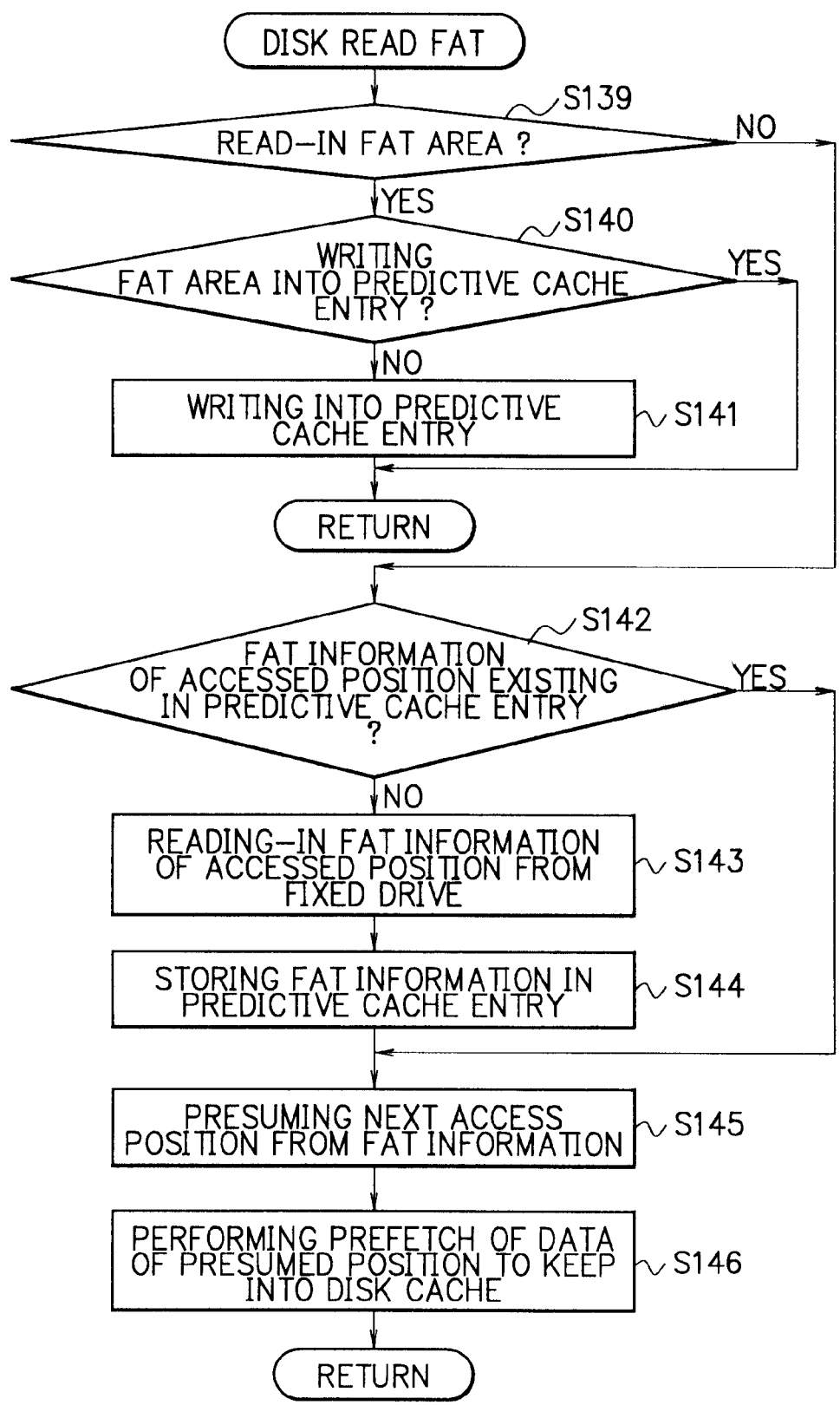
FIG. 10 is a flowchart for explaining operation at the time when there occurs read-in in the FAT file system in the disk control unit of FIG. 1.

There will be described the case where a read-in occurs in the partition storing therein the FAT file system using FIG. 10. Firstly, the prefetch decision circuit 6 confirms whether or not a position which is read-in at STEP 149 is an area of the FAT. If it is a FAT area, the process goes to STEP 140, and if it is an exception of the FAT area, goes to STEP 142. In STEP 140, confirmation is performed whether or not the FAT area which is read-in is written in the predictive cache entry 9 in terms of content. When the content is written in the predictive cache entry 9, return is effected. While when the content is not written in the predictive cache entry 9, in STEP 141, the content of the FAT area is decoded to perform the write to the predictive cache entry 9.

On the other hand, in STEP 142, there is investigated whether or not a concatenated information of an accessed cluster is stored in the predictive cache entry 9. When it is stored therein, the process goes to STEP 145, and when it is not stored therein, it goes to STEP 143 in order to determine the next prefetch position. In STEP 143, a command is issued to the disk control circuit 7 so as to read-in a sector in which the FAT information of the accessed position is contained. The disk control circuit 7 performs a read of the FAT information from the fixed drive 4 to send back to the prefetch decision circuit 6. In STEP 144, decode of the result is performed to store in the predictive cache entry 9.

In STEP 145, data is fetched from the predictive cache entry 9. If the data is a part of successive cluster, command of a read of the continuous area is issued to the disk control circuit 7. If the data is a part of non successive cluster, command of a read of continuity from the next cluster position is issued to the disk control circuit 7. In STEP 146, data from the disk control circuit 7 is received to keep into the disk cache 10.

Figure 11:
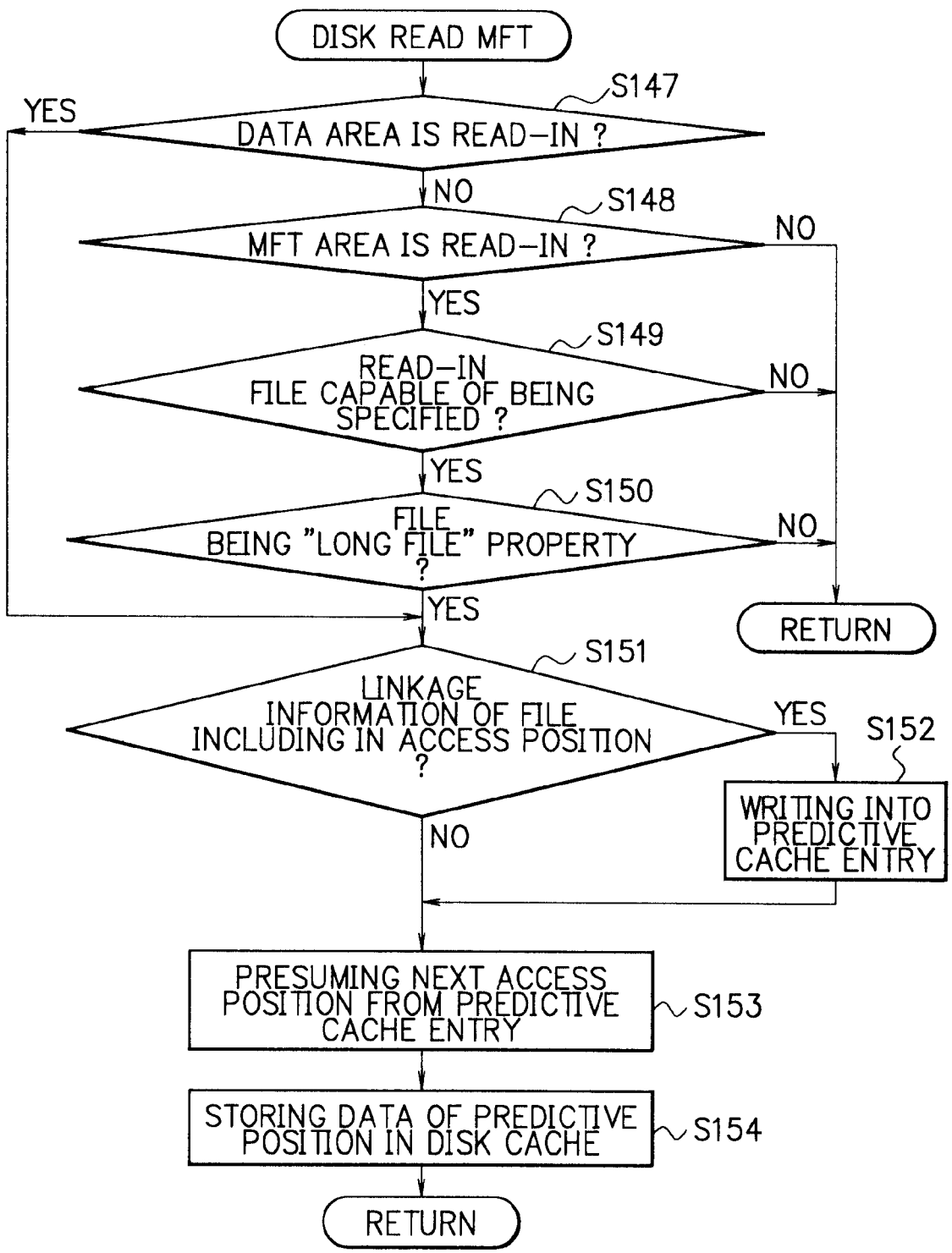
FIG. 11 is a flowchart for explaining operation at the time when there occurs write in NTFS in the disk control unit of FIG. 9.

Next, there will be described operation of the prefetch decision circuit in the case where data on the NT file is read-in using FIG. 11. In STEP 147, there is specified an accessed area. Confirmation is performed whether or not it is an access for the data area. When it is confirmed, the process goes to STEP 151. When there cannot be a specified area accessed in STEP 147, confirmation is performed again for a position of a part read-in in STEP 148, thus deciding whether or not it is MFT area. When it is a read-in about a portion where it can not be specified that it is the effective MFT area, processing is terminated.

In STEP 149, when it is the effective MFT area, it is attempted to specify that the effective MFT area belongs to which file. When the file is capable of being specified, there is confirmed, in STEP 150, an attribute of the file. Investigation is performed whether or not the attribute of the file is a "Long File" property. When the attribute of the file is not a "Long File" property, processing is terminated because it is not necessary to perform prefetch. In STEP 151, investigation is performed whether or not a linkage information of the file is included in an access position. When the linkage information of the file is included, in STEP 152, write is performed to the predictive cache entry 9 in terms of the information.

Next, in STEP 153, there is estimated the next access position which is read-in in the predictive cache entry 9. For instance, in the case where the linkage information of the file is read-in, there is issued the command of prefetch of the position toward the disk control circuit 7, because it is considered that read-in of the file is practically performed while utilizing the information. Further, when a specified part of the data area is read-in, the predictive cache entry 9 determines how the data is stored from the position, thus issuing a command to the disk control circuit. 7 in terms of the position. The disk control circuit 7 receives a read-in instruction. The disk control circuit 7 reads data of the corresponding area from the fixed drive 4 to send. back data to the predictive fetch decision circuit 6.

The prefetch decision circuit 6 receives data of the presumed position in STEP 154 to return, while storing it in the disk cache 10. Subsequently, when sequential read-in of the file practically occurs, the data is capable of being sent back immediately, because the next position is always presumed to be stored. It follows that data is set before the next sequential read-in instructions.

According to the first embodiment of the present invention, there is analyzed the storage configuration of the file stored in the fixed drive, thus prefetch is performed by the information, so that it is capable of improving read-in speed of the file which is stored discontinuously.

Furthermore, according to the first embodiment of the present invention, at the time of starting, and at the time of partition change, there is performed discrimination of the file system while analyzing partition information. Even though, the fixed drive is divided into a plurality of partitions, thus a plurality of file systems are mixed therein, it is capable of performing the prefetch corresponding to respective file systems.

Figure 12:
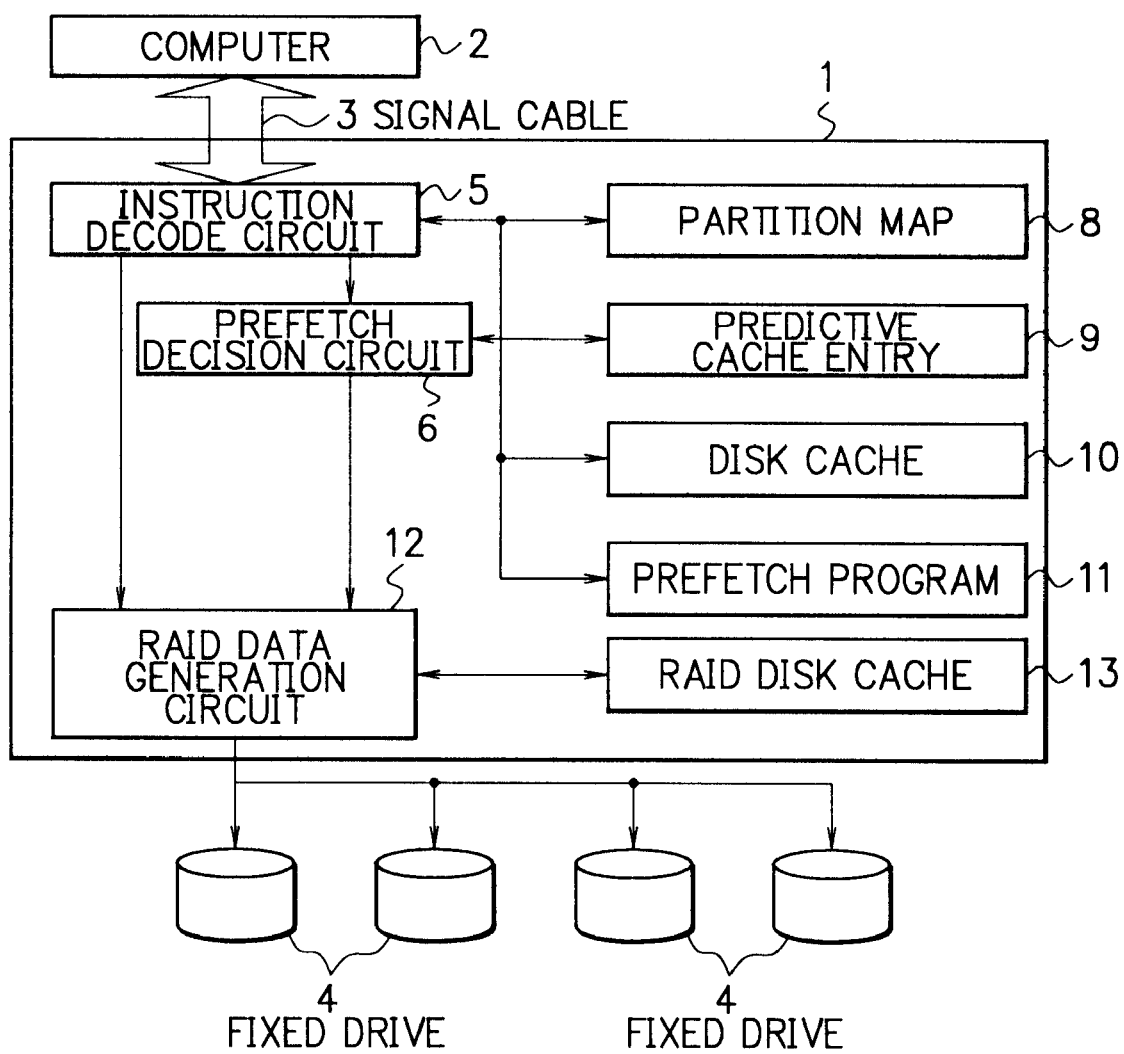
FIG. 12 is a block diagram showing a disk control unit according to a second embodiment of the present invention.

Next, there will be described a disk control unit in detail by way of a second embodiment of the present invention. As shown in FIG. 12, the disk control unit of the second embodiment of the present invention, the disk control circuit 10 of FIG. 1 is replaced with a RAID (Redundant Array Inexpensive Disk) data generation circuit 12, and a RAID, disk cache 13 is added thereto. Namely, the disk control unit 1 by way of the second embodiment of the present invention is provided with the instruction decode circuit 5, the prefetch decision circuit 6, the partition map 8, the predictive cache entry 9, the disk cache 10, the prefetch program 11, the RAID data generation circuit 12, and the RAID disk cache 13. The instruction decode circuit 5 is connected to the computer 2, the prefetch decision circuit 6, the RAID data generation circuit 12, the partition map 8, the predictive cache entry 9, the disk cache 10, and the prefetch program 11. The RAID data generation circuit 12 is connected to the prefetch decision circuit 6, a plurality of fixed drives 4, and the RAID disk cache 13. The prefetch decision circuit 6 is connected to the predictive cache entry 9.

Next, there will be described the disk control unit 1 by way of the second embodiment of the present invention in terms of different points from the disk control unit 1 of FIG. 1. The instruction decode circuit 5 and the prefetch decision circuit 6 transmit the read-in and the write instructions to the RAID data generation circuit 12. The RAID data generation circuit 12 receives instruction which is sent. The RAID data generation circuit 12 decodes that data is stored in which area of which fixed drive 4 in a plurality of fixed drives 4 and that whether or not the data should be stored therein to control the fixed drive 4. Further, the RAID data generation circuit 12 updates the RAID disk cache 13, to sent back the data to the instruction decode circuit 5 or the prefetch decision circuit 6.

There will be described operation of the disk control unit 1 by way of the second embodiment of the present invention. In STEP 102 of FIG. 2, in STEP 106 of FIG. 3, in STEP 114 of FIG. 5, and in STEP 125 of FIG. 7, there is sent the read-in instruction from the instruction decode circuit 5 to the RAID data generation circuit 12 directly. The RAID data generation circuit 12 confirms whether or not the: read-in instruction is stored in the RAID disk cache 13 while decoding the read-in instruction, When the data is stored in the RAID disk cache 13, the data is sent back to the instruction decode circuit 5 where the instruction is issued, thus processing is terminated. When the data is not stored in the RAID disk cache 13, the RAID data generation circuit 12 calculates that the data is stored in which storage block of the fixed drive 4. The RAID data generation circuit 12 issues the read-in instruction to the corresponding fixed drive 4. The RAID data generation circuit 12 sends back data which is sent back to the instruction decode circuit 5, and keeps in the RAID disk cache 13.

By any chance, if error occurs at the time of read-in, and the portion becomes a redundant structure, the RAID data generation circuit 12 reads-in the data from the another fixed drive 4, thus regenerating data, before sending back the data to the instruction decode circuit 5. Further, in STEP 143, and in STEP 146 of FIGS. 4 and 10, and in STEP 154 of FIG. 11, there is sent the read-in instruction from the prefetch decision circuit 6 to the RAID data generation circuit 12. The RAID data generation circuit 12 decodes the read-in instruction, thus confirming whether or not it is stored in the RAID disk cache 13.

The RAID data generation circuit 12, when the data is stored in the RAID disk cache 13, sends back data to the prefetch decision circuit 6 where the instruction is issued, thus processing is terminated. The RAID data generation circuit 12, while when the data is not stored in the RAID disk cache 13, calculates that the data is stored in which storage block of the fixed drive 4. The RAID data generation circuit 12 issues the read-in instruction to the corresponding fixed drive 4. The RAID data generation circuit 12 sends back data which is sent back to the prefetch decision circuit 6, and kept in the RAID disk cache 13.

By any chance, if error occurs at the time of read-in, and the portion becomes a redundant structure, the RAID data generation circuit 12 reads-in the data from the another fixed drive 4, thus regenerating data, before sending back the data to the prefetch decision circuit 6.

Figure 6:
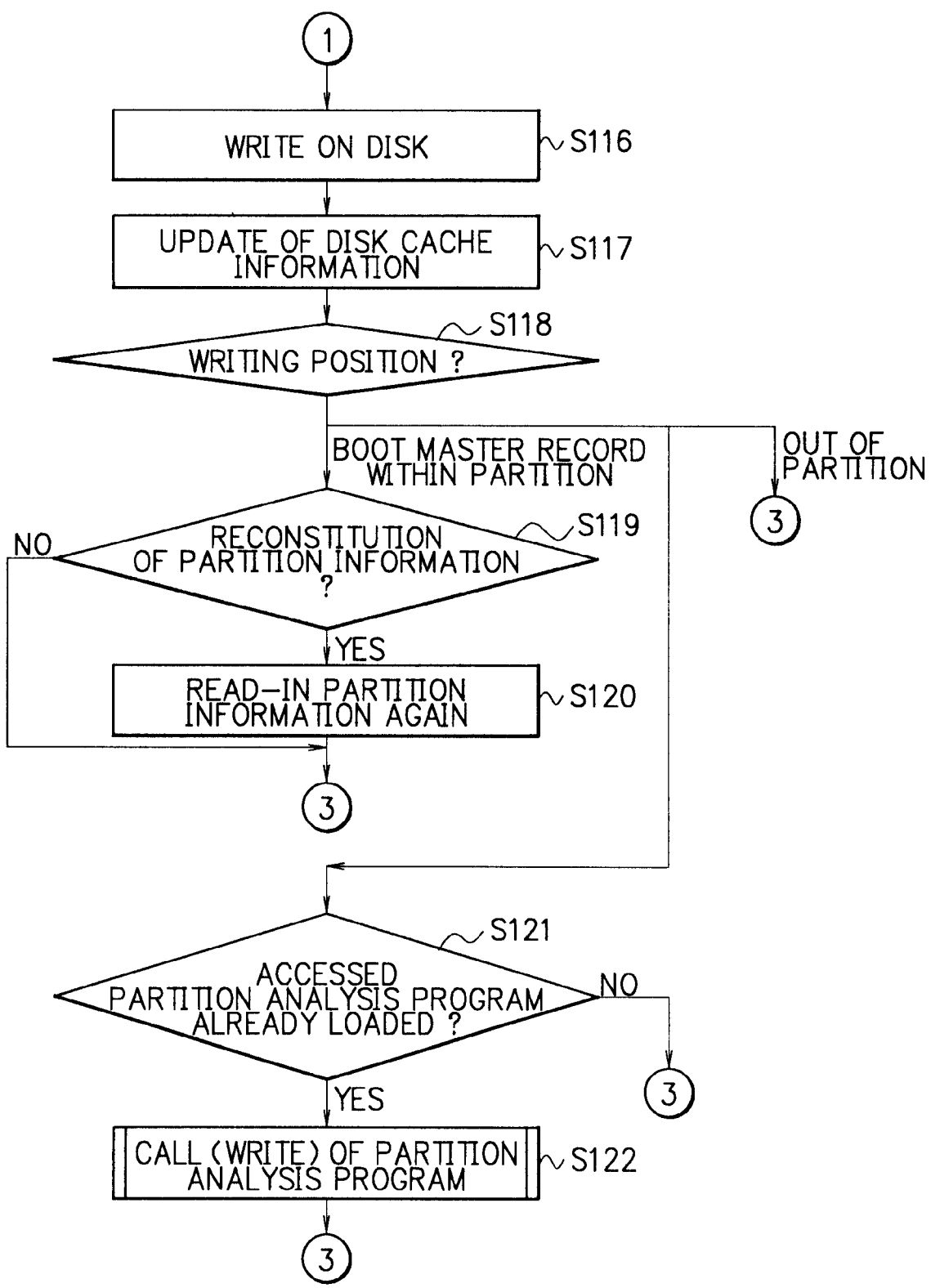
FIG. 6 is a main flowchart for explaining at the time when there occurs write of the disk control unit of FIG. 1.

Furthermore, in STEP 116 of FIG. 6, the RAID data generation circuit 12 receives the write instruction from the instruction decode circuit 6, thus performing a decision whether or not the redundant data is necessary. When the redundant data is not necessary, the RAID data generating circuit 12 calculates that the data should be kept and at which position in the disk, and then terminates processing while writing the data to the determined position. The RAID data generation circuit 12, when it is necessary to generate the redundant data, confirms whether or not the data for the redundant data is already stored in the RAID disk cache 13. The RAID data generation circuit 12, when the data for the redundant data is not stored in the RAID disk cache 13, calls necessary data for regenerating of the redundant data from the fixed drive 4. The RAID data generation circuit 12 regenerates the redundant data according to demand, before writing to be returned to the fixed drive 4 together with the write data.

According to the second embodiment of the present invention, in addition to the effect of the first embodiment of the present invention, in the case where data are dispersed to be kept in a plurality of fixed drives 4, it is capable of performing the prefetch while retrieving data accurately. accurately.

Furthermore, in the first and the second embodiments, it is preferable to rewrite the prefetch program 11 according to command from the computer 2. In accordance with the configuration, it becomes possible to always perform optimum prefetch, because it is capable of being provided with an optimum cache program in the unknown file system occurring in the future.

As is obvious from the above description, according to the embodiment of the present invention, it is possible to improve read-in speed of the file stored in the fixed drive discontinuously.

Furthermore, according to the embodiment of the present invention, the fixed drive is divided into a plurality of partitions. Even though a plurality of file systems are mixed in the partitions, it is capable to perform prefetch in accordance with respective file systems.

While preferred embodiments of the invention have been described using specific terms, the description has been for illustrative purpose only, and it is to be understood that changes and variations may be made without departing from the sprit or scope of the following claims.

What is claimed is:

1. A disk control unit connected to a computer and to a fixed drive, and comprising:
   an instruction decode circuit,
   a partition map,
   a predictive cache entry,
   a disk cache,
   a prefetch program,
   a prefetch decision circuit, and
   a disk control circuit,
   wherein:
      said instruction decode circuit is connected to said computer to decode instruction from said computer,
      said partition map is connected to said instruction decode circuit to maintain a partition information of said fixed drive,
      said predictive cache entry is connected to said prefetch decision circuit to maintain a concatenation state of files which are contained in said fixed drive,
      said disk cache is connected to said instruction decode circuit to maintain both data which is read-in and written in said instruction decode circuit, and data which is read-in into said prefetch decision circuit,
      said prefetch program is connected to said prefetch decision circuit to include a decode program in every file of said prefetch decision circuit,
      said prefetch decision circuit is connected to said instruction decode circuit, to said predictive cache entry, and to said disk control circuit, and receives a read-in instruction from said instruction decode circuit, for determining which partition said read-in instruction belongs to by reference to the partition information of said partition map, then determining which file said read-in instruction belongs to by reference to said predictive cache entry, and subsequently determining which block that said read-in instruction is connected to and directing read-in of the determined block portion toward said disk control circuit and for storing prefetch data read-in previously in said disk cache,
      said disk control circuit is connected to said fixed drive, said instruction decode circuit, and said prefetch decision circuit, for receiving a read-in data and a write instruction from said instruction decode circuit and an instruction from said prefetch decision circuit, thus performing control of said fixed drive, and
      said instruction decode circuit transmits prefetch data which is stored in said disk cache toward said computer without performing a read operation on said fixed drive when the data regarding a read-in instruction coincides with said prefetch data stored in said disk cache, in the cases where said read-in instruction is sent from said computer.

2. A disk control unit as claimed in claim 1, wherein there is provided a program rewrite means for rewriting said prefetch program according to instruction from said computer.

3. A disk control unit connected to a computer and to a fixed drive, and comprising:
   an instruction decode circuit,
   a partition map,
   a predictive cache entry,
   a disk cache,
   a prefetch program,
   a prefetch decision circuit,
   a RAID data generation circuit, and
   a RAID disk cache,
   wherein:
      said instruction decode circuit is connected to said computer to decode executed instruction from said computer,
      said partition map is connected to said instruction decode circuit to maintain a partition information of said fixed drive,
      said predictive cache entry is connected to said prefetch decision circuit to maintain a concatenation state of files which are contained in said fixed drive,
      said disk cache is connected to said instruction decode circuit to maintain both data which is read-in and written in said instruction decode circuit, and data being read-in into said prefetch decision circuit,
   said prefetch program is connected to said prefetch decision circuit to include a decode program in every file of said prefetch decision circuit,
   said prefetch decision circuit is connected to said instruction decode circuit, to said predictive cache entry, and to said RAID data generation circuit, and receives a read-in instruction from said instruction decode circuit, for determining which partition said read-in instruction belongs by reference to the partition information of said partition map, then determining which file said read-in instruction belongs to by reference to said predictive cache entry, and subsequently determining which block that said read-in instruction is connected to and directing read-in of the determined block portion toward said RAID data generation circuit, and for storing prefetch data being read-in previously in said disk cache, said RAID data generation circuit is connected to a plurality of said fixed drives, said instruction decode circuit, and said RAID disk cache, for receiving a read-in data and a write instruction from said instruction decode circuit and an instruction from said prefetch decision circuit, thus performing control of said fixed drive and performing storage and update of data to said RAID disk cache, said instruction decode circuit transmits prefetch data which is stored in said disk cache toward said computer without performing a read operation on said fixed drive when the data regarding a read-in instruction coincides with said prefetch data stored in said disk cache, in the cases where said read-in instruction is sent from said computer.

4. A disk control unit as claimed in claim 3, wherein there is provided a program rewrite means for rewriting said prefetch program according to instruction from said computer.

* * * * *